(12) United States Patent
Benisty

(10) Patent No.: US 11,861,224 B2
(45) Date of Patent: Jan. 2, 2024

(54) DATA TRANSFER MANAGEMENT FROM HOST BUFFERS

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 40 days.

(21) Appl. No.: 17/452,310

(22) Filed: Oct. 26, 2021

(65) Prior Publication Data
US 2023/0128954 A1 Apr. 27, 2023

(51) Int. Cl.
*G06F 3/06* (2006.01)

(52) U.S. Cl.
CPC ............ *G06F 3/0659* (2013.01); *G06F 3/061* (2013.01); *G06F 3/0656* (2013.01); *G06F 3/0673* (2013.01)

(58) Field of Classification Search
CPC ...... G06F 3/0659; G06F 3/061; G06F 3/0656; G06F 3/0673
See application file for complete search history.

(56) References Cited

U.S. PATENT DOCUMENTS

| | | | |
|---|---|---|---|
| 9,047,018 B1* | 6/2015 | Ananthabhotla | ....... G06F 13/28 |
| 9,990,138 B2 | 6/2018 | Halaharivi | |
| 10,095,433 B1* | 10/2018 | Gao | ....................... G06F 3/0659 |
| 10,108,565 B2 | 10/2018 | Olcay et al. | |
| 10,282,132 B2 | 5/2019 | A et al. | |
| 10,642,496 B2* | 5/2020 | Benisty | ................. G06F 3/0685 |
| 10,657,087 B2 | 5/2020 | Tomlin | |
| 10,963,190 B2 | 3/2021 | Haga et al. | |
| 2005/0193164 A1* | 9/2005 | Royer, Jr. | ........... G06F 12/0866 711/E12.019 |
| 2016/0291868 A1* | 10/2016 | Halaharivi | .......... G06F 12/0246 |
| 2017/0060749 A1* | 3/2017 | Segev | .................... G06F 3/0659 |
| 2017/0308329 A1* | 10/2017 | A | .......................... G06F 3/0688 |
| 2020/0050558 A1* | 2/2020 | Suri | ..................... G06F 13/1668 |
| 2021/0019077 A1* | 1/2021 | Richter | ................. G06F 3/0604 |
| 2021/0103445 A1* | 4/2021 | Schauer | ................ G06F 9/3004 |

OTHER PUBLICATIONS

International Search Report and Written Opinion for International Application No. PCT/US2022/029338 dated Sep. 22, 2022.

* cited by examiner

*Primary Examiner* — Ramon A. Mercado
(74) *Attorney, Agent, or Firm* — PATTERSON + SHERIDAN, LLP; Steven H. VerSteeg

(57) ABSTRACT

The present disclosure generally relates to efficient data transfer. Rather than processing each command, the data storage device fetches part of the host buffers and then makes a determination regarding the attributes of the fetched buffers. Upon the determination, the command is classified as optimized, not-optimized, or somewhere in between. Optimized commands are permitted to retrieve data out of order while non-optimized commands remain in a strict in order data retrieval process. In between commands can be processed with some out of order data retrieval. In so doing, data transfers are effectively managed and optimized data by taking into account the current attributes of the host buffers per command.

20 Claims, 9 Drawing Sheets

DATA TRANSFER MANAGEMENT FROM HOST BUFFERS

BACKGROUND OF THE DISCLOSURE

Field of the Disclosure

Embodiments of the present disclosure generally relate to improving data transfer in a data storage device.

Description of the Related Art

Nonvolatile memory express (NVMe) is an interface protocol for a host device and a data storage device, such as a solid state drive (SSD), based on a paired submission and completion queue mechanism. Commands are placed by host software into a submission queue. Completions are placed into a completion queue by a controller of the data storage device. Submission and completion queues are allocated in a memory of a host device.

The physical memory locations in host memory which are used for data transfers are specified using physical region page (PRP) entries or scatter gather list (SGL) entries. The PRP method assumes that each host buffer has the same fixed size other than the first buffer.

On the other hand, SLG methods do not assume anything about the size of the host buffers. Generally, each buffer may have any size. Each buffer is described by a dedicated SGL data block descriptor in which the address and the size of the buffer are specified. The SGL is a more advanced method for describing host buffers while not taking any assumption.

The NVMe standard defines a few types of SGL descriptors. The most basic descriptor is the SGL data block descriptor which describes a single host buffer. The SGL descriptors may be stored non-continuously in the host memory. Each bunch of SGL descriptors is defined as an SGL segment and described by an SGL segment descriptor.

While SGL is a more generic method of that provides full flexibility, PRP is a sub-set of that while having few assumptions. However, the PRP method is more adjusted to SSDs and to out of order transfers supported by the NVMe standard. Stated another way, PRP has the pros of being optimized for SSDs and being simple for implementation, but there is a con of not being flexible enough. SGL, on the other hand, has pros of being very flexible while being a generic approach, but the cons include requiring search operations in out of order transfer, leads to deadlocks, requires more data buffers, and is complex for implementation.

When SGL is used, SLG adds extra complexity to the device controller and might result in performance degradation. In such a scenario, host buffers should be fetched in advance and cached internally so the search operation will not be done in host memory, which will require extra cache buffers integrated into the device controller. The extra cache buffer increases the die size and device cost. For each data transfer, a search operation is required in order to find the relevant host pointer in the cache buffer. The search operation adds extra overhead to the device controller that will increase the latency of each operation.

In a typical workload, PRPs and SGLs are mixed, and not all SGLs are equal. There are SGLs that are optimized for performance (e.g., fixed size such as 4 KB) and non-optimal SGLs (e.g., small ones in byte granularity) that are not optimized for performance. Thus, there is an issue of having a workload with mixed PRPs and SGLs with several attributes.

Therefore, there is a need in the art for managing and optimizing data transfers while taking into account the current attributes of the host buffers per command.

SUMMARY OF THE DISCLOSURE

The present disclosure generally relates to efficient data transfer. Rather than processing each command, the data storage device fetches part of the host buffers and then makes a determination regarding the attributes of the fetched buffers. Upon the determination, the command is classified as optimized, not-optimized, or somewhere in between. Optimized commands are permitted to retrieve data out of order while non-optimized commands remain in a strict in order data retrieval process. In between commands can be processed with some out of order data retrieval. In so doing, data transfers are effectively managed and optimized data by taking into account the current attributes of the host buffers per command.

In one embodiment, a data storage device comprises: a memory device; and a controller coupled to the memory device, wherein the controller is configured to: fetch a command and at least a portion of one or more host buffers from a host device; determine whether the command corresponds to a physical region page (PRP) entry in a host buffer; and either: permit full out of order data retrieval from the memory device; and permit partial out of order data retrieval from the memory device; or enforce full in order data retrieval from the memory device.

In another embodiment, a data storage device comprises: a memory device; and a controller coupled to the memory device, wherein the controller includes: a host interface module (HIM) having: a host buffer manager; and an order enforcing module; a command scheduler; and a flash interface module (FIM).

In another embodiment, a data storage device comprises: memory means; and a controller coupled to the memory means, wherein the controller is configured to: fetch a command from a host submission queue; fetch a portion of data associated with the host command; determine whether the portion of data corresponds to a physical region page (PRP) entry, an optimized scatter-gather list (SGL) entry, or a not-optimized SGL entry; classify the command according to the determination; enforce a data retrieval order based upon the classification; transfer data to a host device; and post a completion entry to a host completion queue.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to efficient data transfer. Rather than processing each command, the data storage device fetches part of the host buffers and then makes a determination regarding the attributes of the fetched buffers. Upon the determination, the command is classified as optimized, not-optimized, or somewhere in between. Optimized commands are permitted to retrieve data out of order while non-optimized commands remain in a strict in order data retrieval process. In between commands can be processed with some out of order data retrieval. In so doing, data transfers are effectively managed and optimized data by taking into account the current attributes of the host buffers per command.

Figure 1:
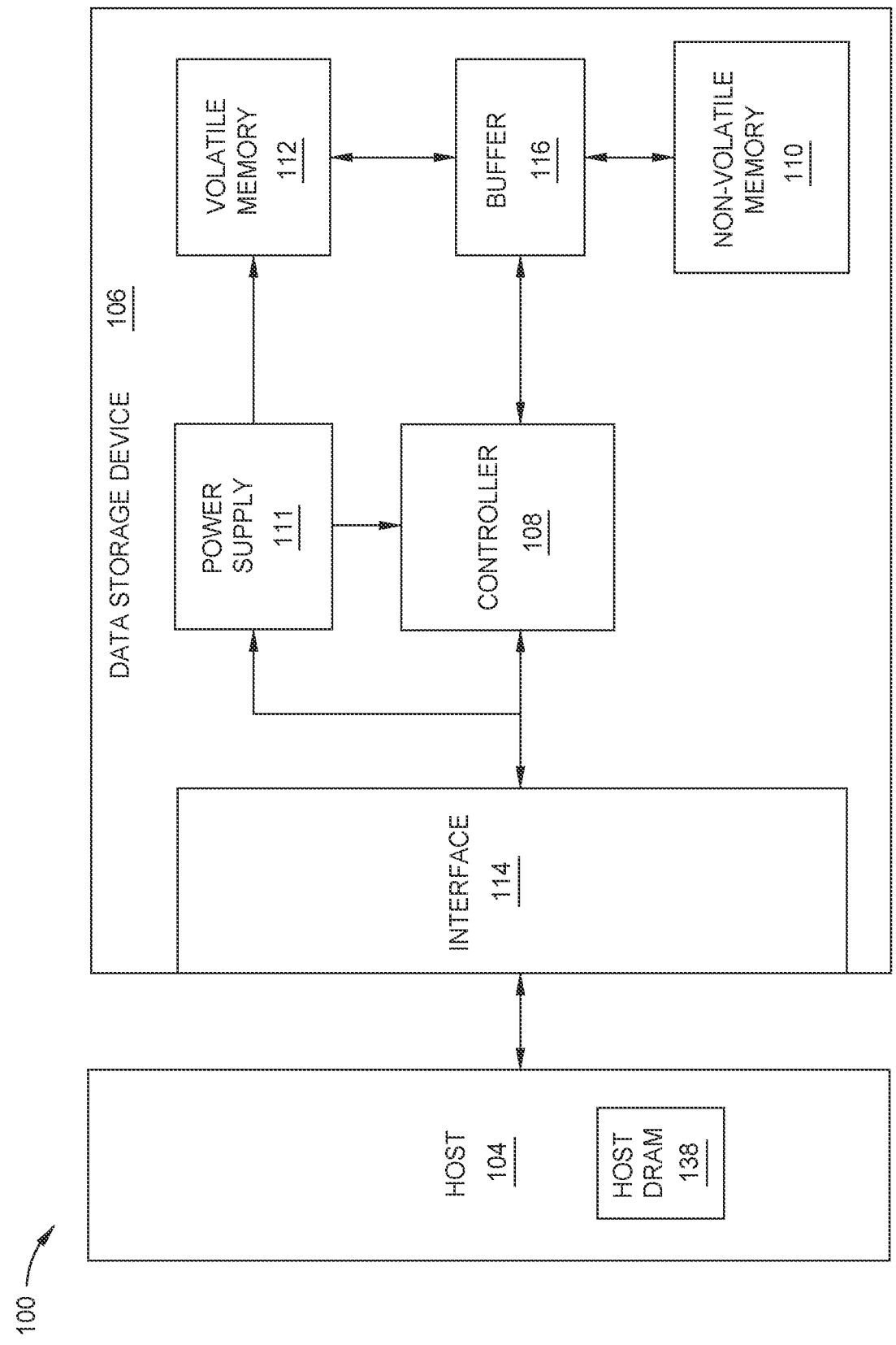
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
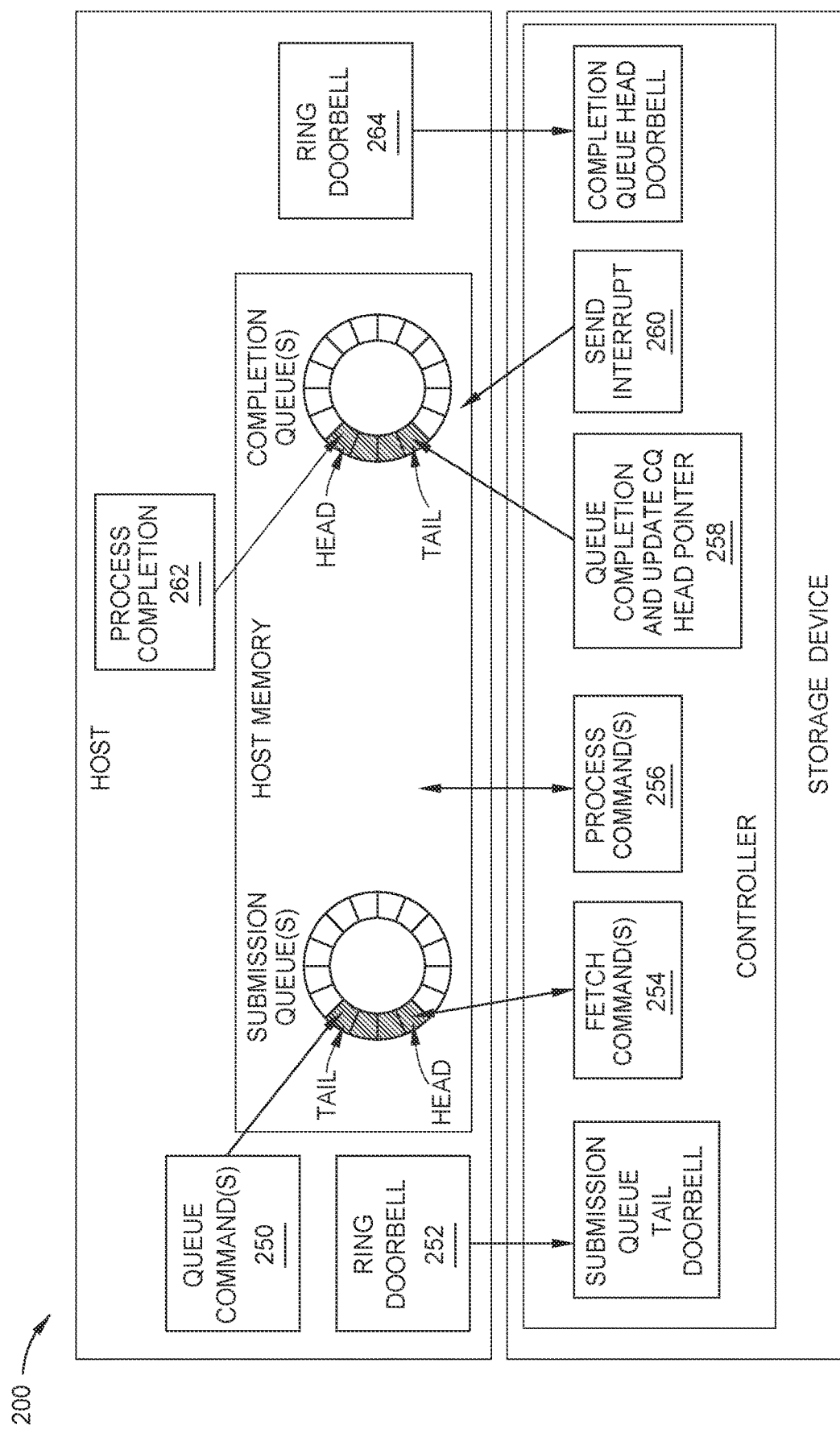
FIG. 2 is a block diagram illustrating a method of operating a storage device to execute a read or write command, according to one embodiment.

FIG. 2 is a block diagram illustrating a method 200 of operating a storage device to execute a read, write, or compare command, according to one embodiment. Method 200 may be used with the storage system 100 having a host device 104 and a data storage device 106 comprising a controller 108. Method 200 may be used with the device a host device and a data storage device comprising a command processor.

Method 200 begins at operation 250, where the host device writes a command into a submission queue as an entry. The host device may write one or more commands into the submission queue at operation 250. The commands may be read commands or write commands or compare commands. The host device may comprise one or more submission queues. The host device may write one or more commands to the submission queue in any order (i.e., a submission order), regardless of the sequential write order of the one or more commands (i.e., a sequential processing order).

In operation 252, the host device writes one or more updated submission queue tail pointers and rings a doorbell or sends an interrupt signal to notify or signal the storage device of the new command that is ready to be executed. The host may write an updated submission queue tail pointer and send a doorbell or interrupt signal for each of the submission queues if there are more than one submission queues. In operation 254, in response to receiving the doorbell or interrupt signal, a controller of the storage device fetches the command from the one or more submission queue, and the controller receives or DMA reads the command.

In operation 256, the controller processes the command and writes, transfers data associated with a read command to the host device memory, or retrieves data for a compare command. The controller may process more than one command at a time. The controller may process one or more commands in the submission order or in the sequential order. Processing a write command may comprise identifying a stream to write the data associated with the command to and writing the data to one or more logical block address (LBA) of the stream.

In operation 258, once the command has been fully processed, the controller writes a completion entry corresponding to the executed command to a completion queue of the host device and moves or updates the CQ head pointer to point to the newly written completion entry.

In operation 260, the controller generates and sends an interrupt signal or doorbell to the host device. The interrupt signal indicates that the command has been executed and data associated with the command is available in the memory device. The interrupt signal further notifies the host device that the completion queue is ready to be read or processed.

In operation 262, the host device processes the completion entry. In operation 264, the host device writes an updated CQ head pointer to the storage device and rings the doorbell or sends an interrupt signal to the storage device to release the completion entry.

Figure 3:
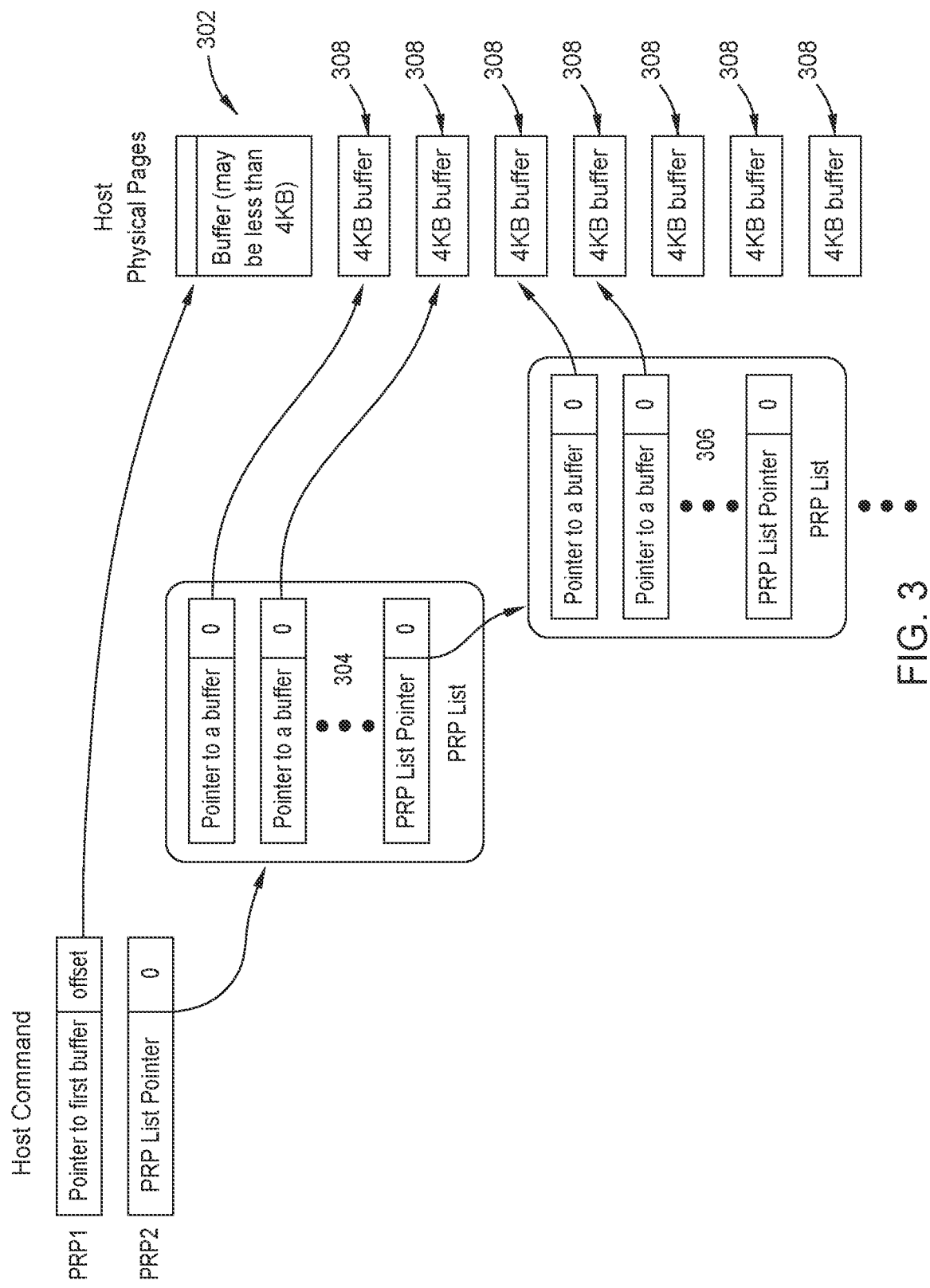
FIG. 3 is a schematic illustration of host buffers using physical region page (PRP) entries according to one embodiment.

FIG. 3 is a schematic illustration of host buffers using physical region page (PRP) entries according to one embodiment. When using PRP entries, it is assumed that each host buffer has the same fixed size, except for the first host buffer. PRP1 points to the first host buffer 302, which, as noted, may be less than 4 KB, exactly 4 KB or more than 4 KB. Additionally, the first host buffer 302 may be the exact same size as the remaining host buffers 308, but may also be different. PRP2, however, may point to a PRP list 304. In the scenario shown in FIG. 3, there are two PRP lists, but it is to be understood that more or less PRP lists may be present. The number of PRP lists depends upon the data transfer size of the relevant command. As shown in FIG. 3, the last pointer in the PRP list 304 points to another PRP list 306. Each additional host buffer 308 is the same size, which in the embodiment shown in FIG. 3, is 4 KB. It is to be understood that while 4 KB is shown at the example size of the host buffers 308, other sizes are contemplated. It is also to be noted that host buffers 308 will be the same size, regardless of what the size happens to be.

Figure 4:
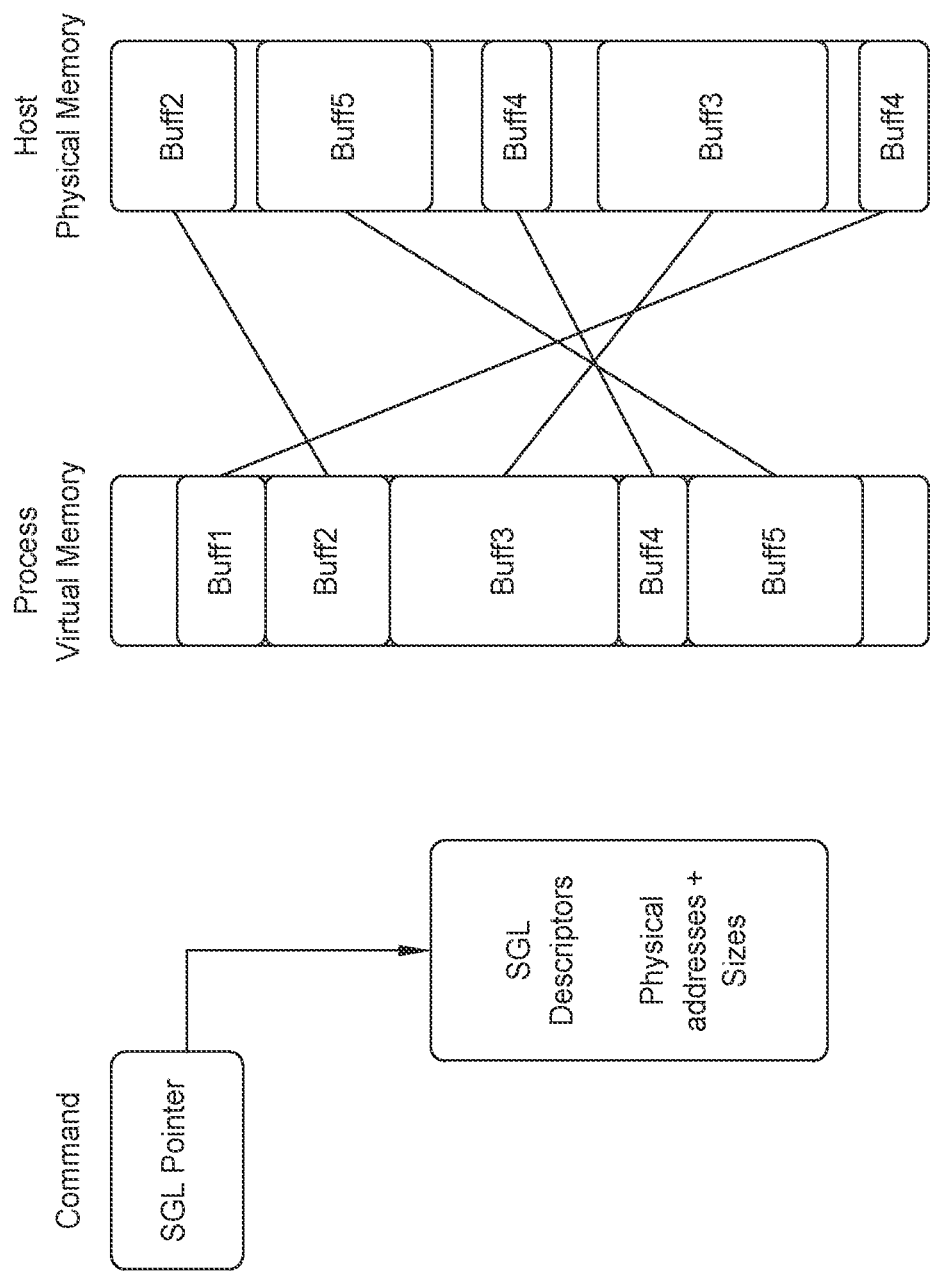
FIG. 4 is a schematic illustration of host buffers using scatter gather lists (SGL) entries according to one embodiment.

FIG. 4 is a schematic illustration of host buffers using scatter gather lists (SGL) entries according to one embodiment. When using SGL entries, there is no assumption about the size of the host buffers, in contrast to PRP entries. Generally, each host buffer may have any size, as illustrated in FIG. 4. Each host buffer is described by a dedicated SGL data block descriptor in which the address and the size of the host buffer are specified. The SGL is a more advanced method for describing host buffers while not making any assumptions. As shown in FIG. 4, the SGL pointer points to SGL descriptors that includes the physical addresses and sizes of the host buffers. The host buffers are in the host physical memory, with each host buffer having a different size as illustrated in FIG. 4. The host buffers in the host physical memory correspond to host buffers that are disposed in the process virtual memory.

The NVMe standard defines a few types of SGL descriptors. The most basic descriptor is the SGL data block descriptor which describes a single host buffer. The SGL descriptors may be stored non-continuously in the host memory. Each bunch of SGL descriptors is defined as a SGL segment and described by an SGL segment descriptor.

Figure 5:
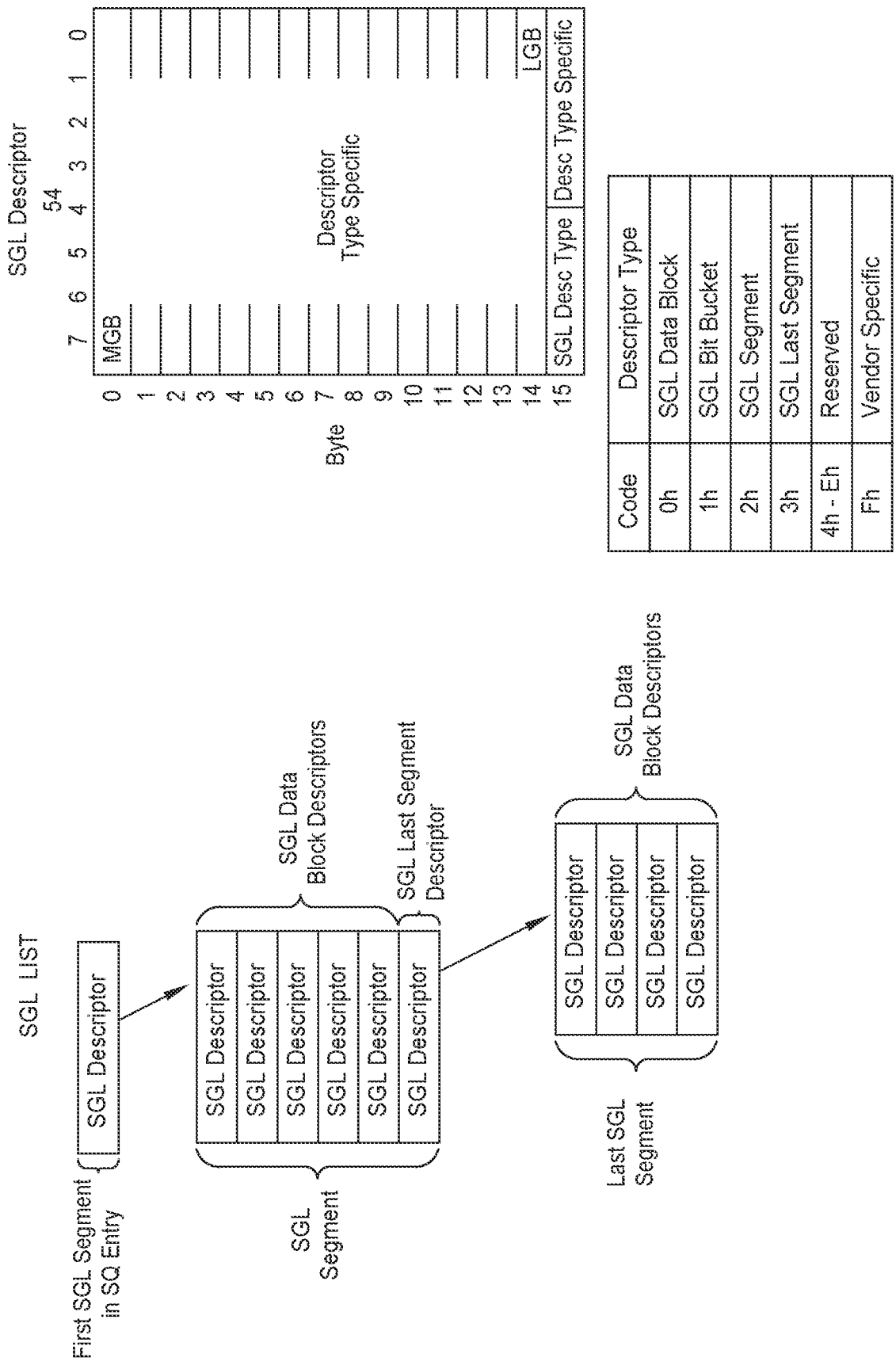
FIG. 5 is a schematic illustration of a SGL method according to one embodiment.

FIG. 5 is a schematic illustration of a SGL method according to one embodiment. The NVMe command contains an SGL segment descriptor which points to a bunch of SGL data block descriptors. The last descriptor in this chunk is an SGL last segment descriptor which points to the last bunch of SGL data block descriptors.

As discussed herein, a method for host buffers and data transfer management that makes the tradeoff between simplicity, performance requirements, and other parameters is disclosed. The data transfer of each command depends on the host buffer list provided by the host device. The more optimized the host device buffer list, the more non-constraints data transfer. When the host device provides an optimized host buffer list, the data transfer can be unlimited and provides the best performance and quality of service (QoS). When the host device provides non-optimizes buffer lists, the data transfer will be limited and in the worst case scenario the data transfer would be in order.

As will be additionally discussed below, the method involves partial fetching of host buffers. In one example, the data storage device fetches the host buffers associated with the first 16 KB data transfer associated with each command. The command is classified based upon the attributes of the fetched host buffers. When the host buffers are fully optimized (i.e., PRP or PRP like), then the command is classified as an optimized command. When the host buffers are non-optimized (i.e., too many unaligned host buffers and byte granularity), the command is classified as a non-optimized command. Several thresholds may be defined between those scenarios. Based upon the command classification, the data transfer attribute for each command is defined so that order enforcement in the data transfer occurs. For instance, no-order rules, partial order rules, or order enforcement (in-order transfers) occurs. In order transfers simplify the transfers when having non-optimized host buffers and eliminates the search operations because everything is in order.

Figure 6:
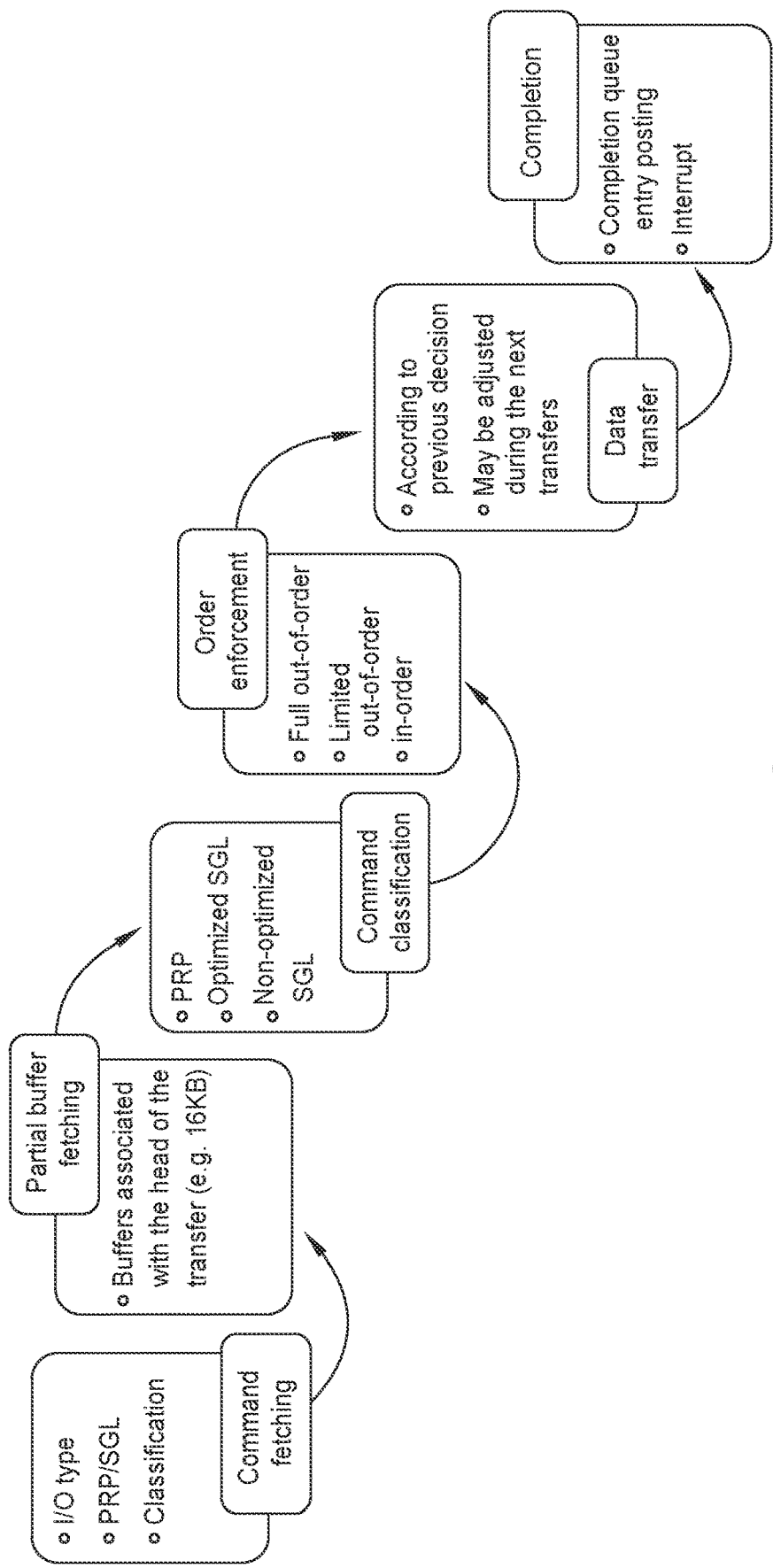
FIG. 6 is schematic illustration of host buffers and data transfer management according to one embodiment.

FIG. 6 is schematic illustration of host buffers and data transfer management according to one embodiment. The command is initially fetched from the host memory. The logic parses the command and determines the type of the command and the host buffer method used (i.e., PRP or SGL). Part of the host buffers are fetched from the host memory in the SGL scenario. In one example, the host buffers associated with the first 16 KB of the data transfer are fetched, but the amount fetched may depend upon the size of each SGL entry. The command is classified based on the fetched host buffers. The command could be PRP, optimized SGL, or non-optimized SGL commands. In some embodiments, more than the PRP, optimized SGL and non-optimized SGL command thresholds is contemplated.

The order of the data transfer is defined based on the classification. In PRP or optimized SGL, the data transfer may not be limited and full out of order data transfer is supported. Full out of order data transfer can be done because the host buffers are optimized and no special search is necessary. In the worst case scenario, in order data transfer is enforced. In order data transfer simplifies the data path and buffer management because the search operation is not required. The drawback is in performance and QoS, but performance and QoS are less important because the host buffers are not optimized for performance and QoS. In other scenarios, the data transfer might be limited (e.g., out of order within 128 KB but not between two consecutive 128 KB). The data transfer is enforced based upon the above decision, but the decision might be changed during the fetching of the next SGL host buffers in some embodiments. A completion message is posted to the host device along with the interrupt signal once completing the data transfer of the command.

Figure 7:
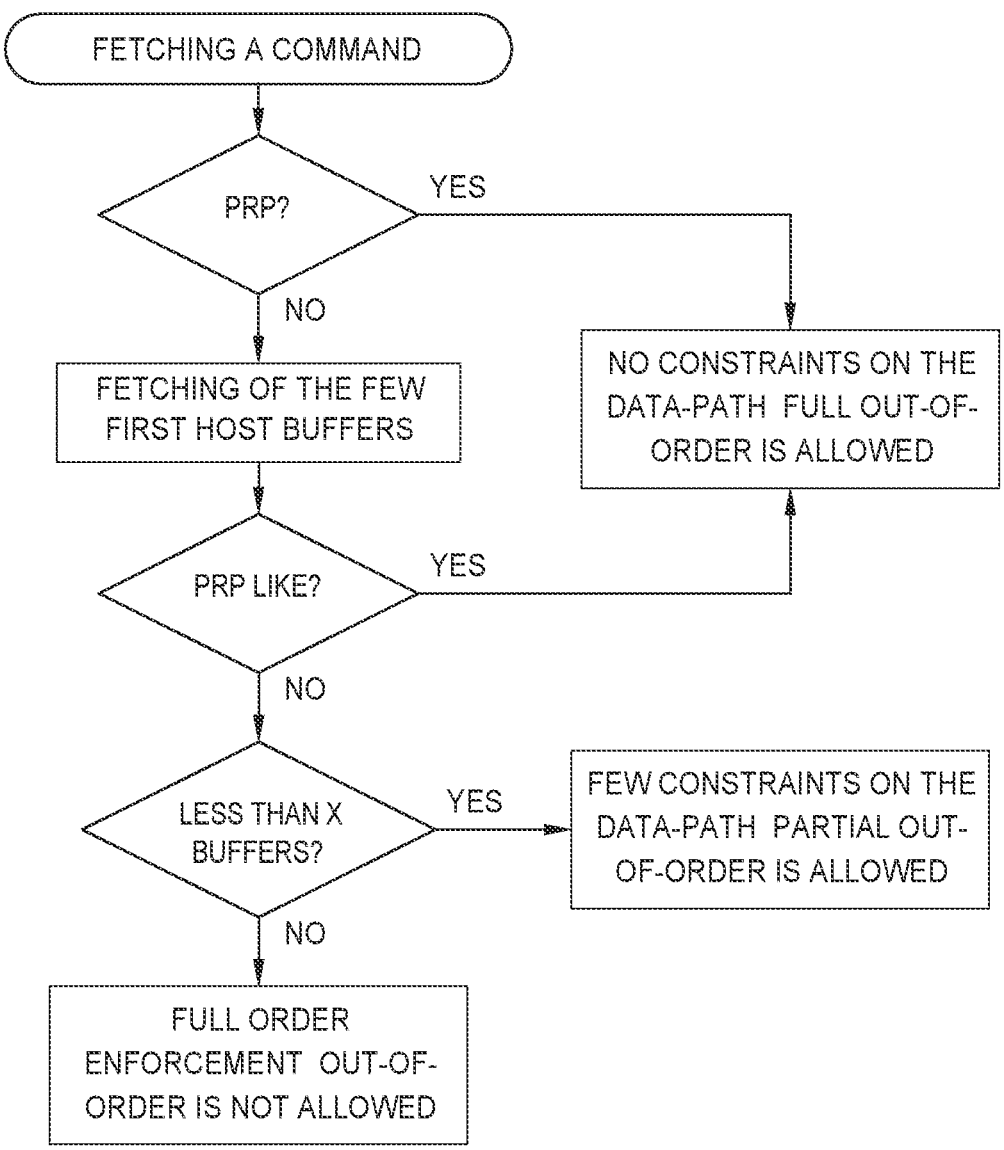
FIG. 7 is a flowchart illustrating command classification according to one embodiment.

FIG. 7 is a flowchart illustrating command classification according to one embodiment. For PRP or PRP like situations, the data transfer is not limited and full out of order data transfer is permitted. When having optimized SGL, some constraints are added to the data transfer. Otherwise, the data transfer is in order only. SGL classification considers several parameters such as number of host buffers per X-MB, host buffer alignment, and SGL attributes such as number of segments, SGL types, etc. It is contemplated that more thresholds can be defined for the host buffer attributes considering buffer size, buffer alignment, number of SGL segments, etc. Such thresholds determine the data transfer ordering and priority. The more optimal the host buffers, the less limitation is placed on the data transfer.

Figure 8:
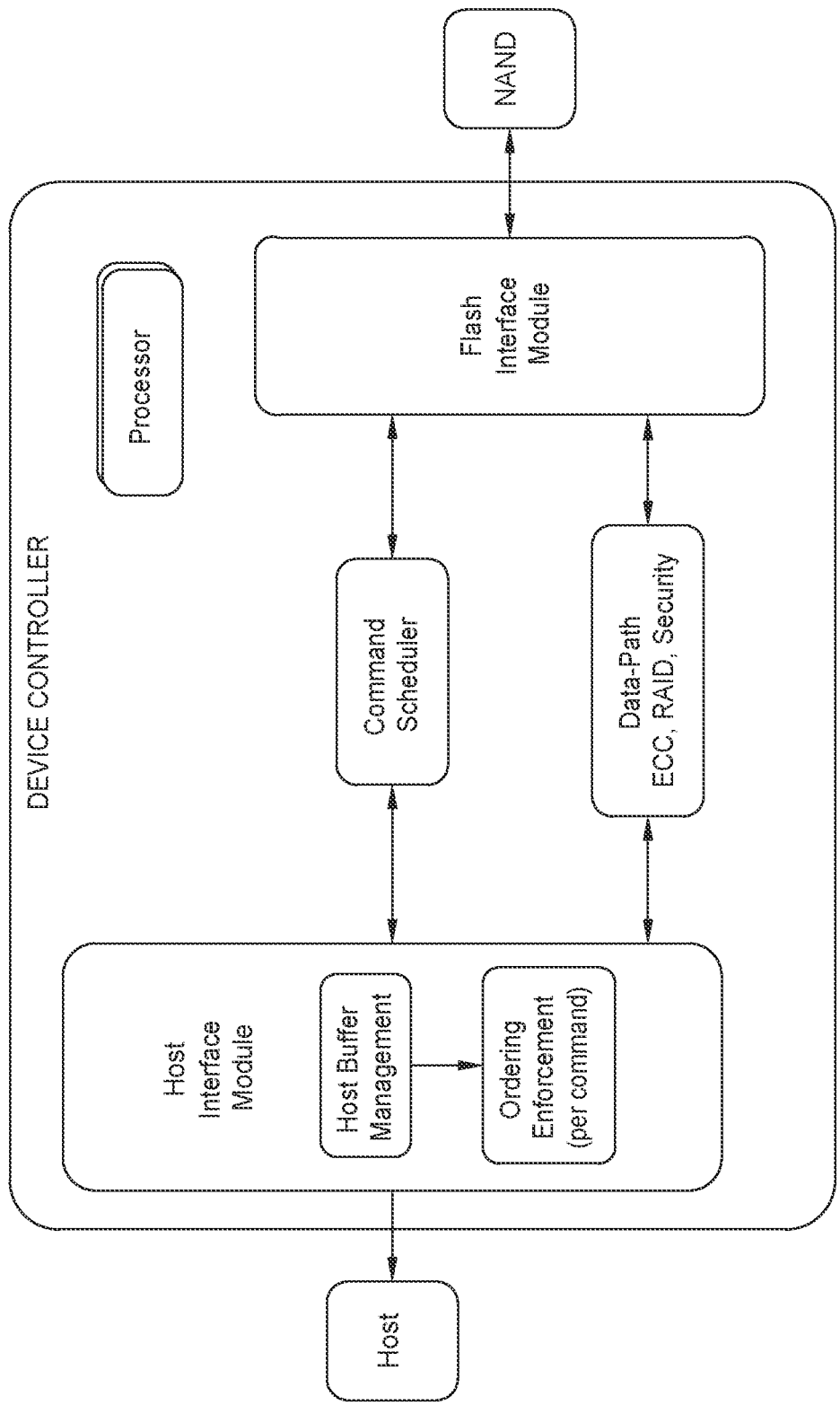
FIG. 8 is a high level block diagram of a storage system according to one embodiment.

FIG. 8 is a high level block diagram of a storage system according to one embodiment. As shown in FIG. 8, a host buffer manager and an ordering enforcement (per command) module are disposed in the host interface module (HIM). The host buffer manager is responsible for fetching the host buffers for all commands. Based on the first host buffers fetched for a command, the command is classified and the order rules for the data transfer are set. Both the command scheduler and the ordering enforcement module receive the decision and act accordingly. In one embodiment, the order enforcement module and the host buffer manager are logic. The command scheduler limits the sense requests towards the flash interface module (FIM) and the ordering enforcement module reorder the transfer accordingly.

Figure 9:
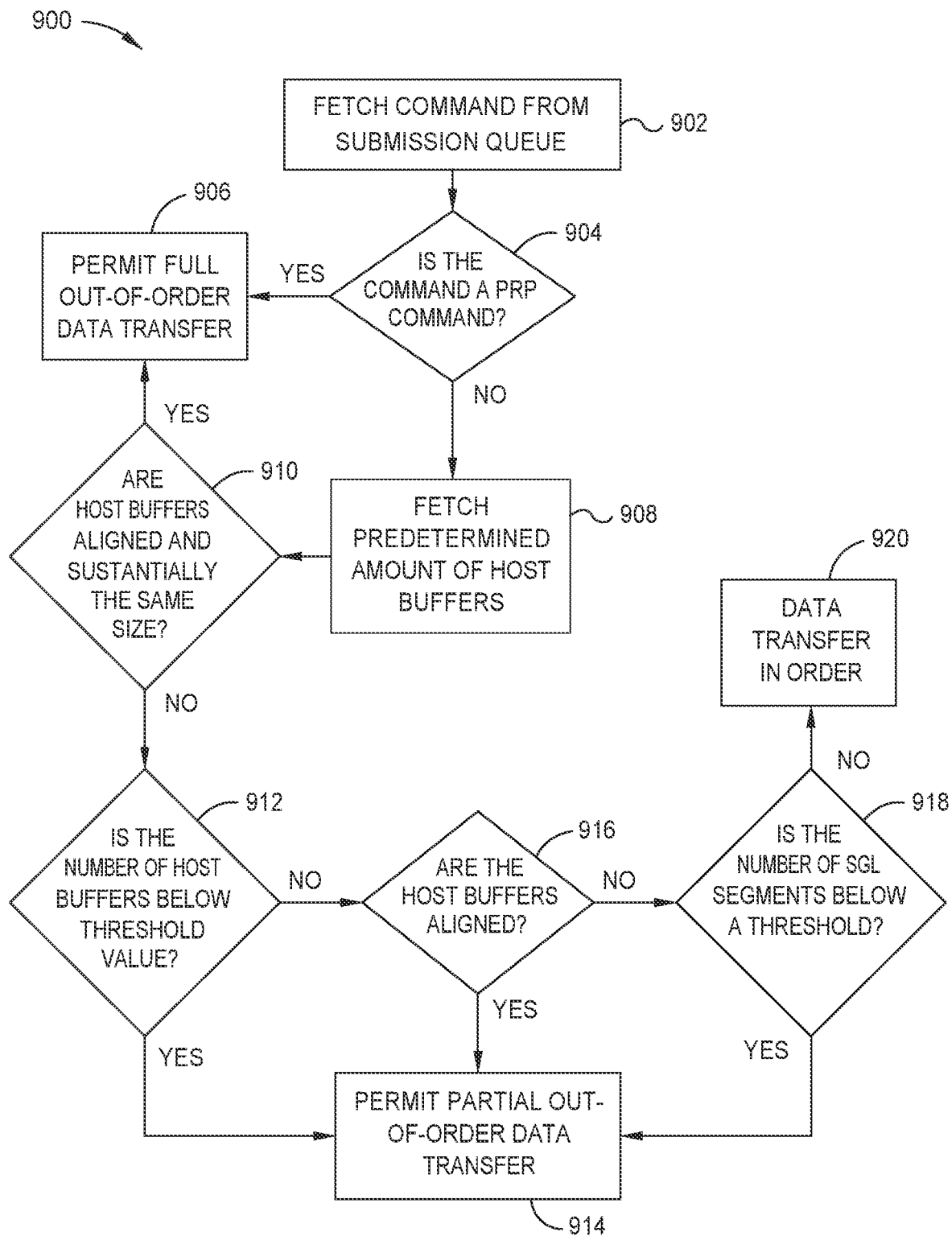
FIG. 9 is a flowchart illustrating efficient data transfer according to one embodiment.

FIG. 9 is a flowchart 900 illustrating efficient data transfer according to one embodiment. Initially, a doorbell is rung and the data storage device then fetches commands from the submission queue of the host device at 902. Before retrieving any data associated with the command, the data storage device determines whether the command retrieved is a PRP command at 904. If the command is a PRP command, then the data associated with the command can be transferred in any order as a full out of order data transfer is permitted at 906. With the permission of full out of order data transfer, data may be transferred in order, in a completely random order, or a hybrid thereof.

If the command is not a PRP command, the data storage device endeavors to determine whether there is any way in which data can be transferred out of order. Therefore, a predetermined amount of host buffers is fetched at 908. In one embodiment, the predetermined amount of 16 KB from each host buffer. In such a scenario, the first 16 KB associated with the host buffer(s) of the command is fetched. A determination is then made regarding the host buffers. Specifically, whether the host buffers are aligned and have substantially the same size. If the host buffers are aligned and have substantially the same size, then even though the command is an SGL entry, the SGL entry is PRP like (e.g., an SGL entry that is arranged as a PRP entry would be arranged) and thus can be treated in the same manner as a PRP entry such that full out of order data transfer is permitted at 906.

If the host buffers are not aligned or the host buffers are not the substantially the same size at 910, then a determination is made regarding whether the number of host buffers is below a predetermined threshold at 912. In one embodiment, the threshold is 20 SGL entries per 4 KB of data transfer. It is to be understood that 20 SGL entries per 4 KB is just one example as other possibilities are contemplated such as 20 SGL entries per 4 KB on average. If the number of host buffers is below the predetermined threshold, then a partial out of order data transfer is permitted at 914. As an example of a partial out of order data transfer, data may be fetched in any order form the memory device (i.e., NAND device) but then reordered when the data is transferred to the host device. As another example of partial out of order data transfer, the number of requests issued towards the memory device (i.e., NAND device) is limited, and all data is then retrieved in order. However, if the number of buffers is at or above the predetermined threshold at 912, then a determination is made regarding whether the host buffers are aligned at 916. If the host buffers are aligned, then a partial out of order data transfer is permitted at 914. However, if the host buffers are not aligned, then a determination is made regarding whether the number of SGL segments is below a predetermined threshold at 918. In one embodiment, the threshold is 8 SGL segments per command. If the number of SGL segments is below the predetermined threshold, then a partial out of order data transfer is permitted at 914. However, if the number of SGL segments is at or above the predetermined threshold at 918, then a strict in order data transfer is enforced at 920.

By taking into account the attributes of host buffers for a command, data transfers are effectively managed. Optimized commands are permitted to be retrieve data out of order while non-optimized commands remain in a strict in order data retrieval. In between commands can be processed with some out of order data retrieval.

In one embodiment, a data storage device comprises: a memory device; and a controller coupled to the memory device, wherein the controller is configured to: fetch a command and at least a portion of one or more host buffers from a host device; determine whether the command corresponds to a physical region page (PRP) entry in a host buffer; and either: permit full out of order data retrieval from the memory device; and permit partial out of order data retrieval from the memory device; or enforce full in order data retrieval from the memory device. The determining comprises determining that the command does not correspond to a PRP entry. The controller is configured to determine that the command corresponds to a scatter-gather list (SGL) command. The controller is further configured to determine whether the SGL command corresponds to aligned buffers. The controller is further configured to permit partial out of order data retrieval upon determining that the SGL command corresponds to aligned buffers. The controller is further configured to determine whether the SGL command corresponds to buffers having substantially the same size. The controller is further configured to enforce full in order data retrieval upon determining that the SGL command corresponds to buffers having different sizes. The controller is further configured to determine that the command is corresponds to a scatter-gather list (SGL) command, wherein the controller is further configured to determine whether the SGL command corresponds to aligned buffers and buffers of substantially the same size, and wherein the controller is further configured to permit full out of order data retrieval upon determining that the SGL command corresponds to aligned buffers and buffers of substantially the same size.

In another embodiment, a data storage device comprises: a memory device; and a controller coupled to the memory device, wherein the controller includes: a host interface module (HIM) having: a host buffer manager; and an order enforcing module; a command scheduler; and a flash interface module (FIM). The order enforcing module is logic contained within the HIM. The host buffer manager is configured to fetch host buffers for commands received from a host device. The host buffer manager is configured to fetch less than all host buffers for the commands. The order enforcing module is configured to enforce data transfer as full out of order, partial out of order, or full in order based upon buffers fetched by the host buffer manager. The controller is configured to classify commands received by a host device as physical region page (PRP), scatter-gather list (SGL) optimized, or SGL non-optimized. The controller is further configured to set a data transfer order for sending data to the host device based upon the classifying.

In another embodiment, a data storage device comprises: memory means; and a controller coupled to the memory means, wherein the controller is configured to: fetch a command from a host submission queue; fetch a portion of data associated with the host command; determine whether the portion of data corresponds to a physical region page (PRP) entry, an optimized scatter-gather list (SGL) entry, or a not-optimized SGL entry; classify the command according to the determination; enforce a data retrieval order based upon the classification; transfer data to a host device; and post a completion entry to a host completion queue. The enforcing comprises retrieving data in any order, fully in order, or partially out of order based upon the classifying. The controller is further configured to determine a size of host buffers associated with the portion of data. The controller is further configured to determine an alignment of host buffers associated with the portion of data. The controller comprises a command scheduler, wherein the command scheduler limits sense requests towards a flash interface module (FIM) based upon the enforcing.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
fetch a command and at least a portion of one or more host buffers from a host device, wherein the portion of the one or more host buffers is less than all the host buffers;
classify the command based on the portion of the one or more host buffers;
determine whether the command corresponds to a physical region page (PRP) entry in a host buffer; and
either:
permit full out of order data transfer to a host device based on the classification of the command; and
permit partial out of order data transfer to the host device based on the classification of the command; or
enforce full in order data transfer to the host device based on the classification of the command.

2. The data storage device of claim 1, wherein the determining comprises determining that the command does not correspond to a PRP entry.

3. The data storage device of claim 2, wherein the controller is configured to determine that the command corresponds to a scatter-gather list (SGL) command.

4. The data storage device of claim 3, wherein the controller is further configured to determine whether the SGL command corresponds to aligned buffers.

5. The data storage device of claim 4, wherein the controller is further configured to permit partial out of order data transfer upon determining that the SGL command corresponds to aligned buffers.

6. The data storage device of claim 3, wherein the controller is further configured to determine whether the SGL command corresponds to buffers having the same size.

7. The data storage device of claim 6, wherein the controller is further configured to enforce full in order data transfer upon determining that the SGL command corresponds to buffers having different sizes.

8. The data storage device of claim 1, wherein the controller is further configured to determine that the command corresponds to a scatter-gather list (SGL) command, wherein the controller is further configured to determine whether the SGL command corresponds to aligned buffers and buffers of the same size, and wherein the controller is further configured to permit full out of order data transfer upon determining that the SGL command corresponds to aligned buffers and buffers of the same size.

9. A data storage device, comprising:
a memory device; and
a controller coupled to the memory device, wherein the controller includes:
a host interface module (HIM) having:
a host buffer manager configured to:
fetch a portion of one or more host buffers for a command, wherein the portion of the one or more host buffers is less than all the host buffers;
classify the command based on the portion of the one or more host buffers;
determine whether the command corresponds to a physical region page (PRP) entry in the one or more host buffers; and
either:
permit full out of order data transfer to a host device based on the classification of the command; and
permit partial out of order data transfer to the host device based on the classification of the command; or
enforce full in order data transfer to the host device based on the classification of the command; and
an order enforcing module;
a command scheduler; and
a flash interface module (FIM).

10. The data storage device of claim 9, wherein the order enforcing module is logic contained within the HIM.

11. The data storage device of claim 9, wherein the host buffer manager is configured to fetch host buffers for commands received from a host device.

12. The data storage device of claim 11, wherein the host buffer manager is configured to fetch less than all host buffers for the commands.

13. The data storage device of claim 9, wherein the order enforcing module is configured to enforce data transfer as full out of order, partial out of order, or full in order based upon buffers fetched by the host buffer manager.

14. The data storage device of claim 9, wherein the controller is configured to classify commands received by the host device as physical region page (PRP), scatter-gather list (SGL) optimized, or SGL non-optimized.

15. The data storage device of claim 14, wherein the controller is further configured to set the data transfer order for sending data to the host device based upon the classifying.

16. A data storage device, comprising:
memory means; and
a controller coupled to the memory means, wherein the controller is configured to:
fetch a command from a host submission queue;
fetch a portion of data associated with the command, wherein the portion of data is less than all the data associated with the command;
classify the command based on the portion of data;
determine whether the portion of data corresponds to a physical region page (PRP) entry, an optimized scatter-gather list (SGL) entry, or a not-optimized SGL entry;
and either:
- permit full out of order data transfer to a host device based on the classification of the command; and
- permit partial out of order data transfer to the host device based on the classification of the command; or
- enforce full in order data transfer to the host device based upon the classification of the command;

and post a completion entry to a host completion queue.

17. The data storage device of claim 16, wherein the classification comprises retrieving data in any order, fully in order, or partially out of order based upon the classifying.

18. The data storage device of claim 16, wherein the controller is further configured to determine a size of host buffers associated with the portion of data.

19. The data storage device of claim 16, wherein the controller is further configured to determine an alignment of host buffers associated with the portion of data.

20. The data storage device of claim 16, wherein the controller comprises a command scheduler, wherein the command scheduler limits sense requests towards a flash interface module (FIM) based upon the enforcing.

* * * * *